United States Patent [19]

Matsunaga et al.

[11] Patent Number: 4,634,862
[45] Date of Patent: Jan. 6, 1987

[54] METHOD OF FABRICATING ROTOR OF OPTICAL ROTARY ENCODER

[75] Inventors: Hiroshi Matsunaga; Yoji Shimojima; Ichiro Tokunaga, all of Furukawa, Japan

[73] Assignee: Alps Electric Co., Ltd., Japan

[21] Appl. No.: 632,440

[22] Filed: Jul. 19, 1984

[30] Foreign Application Priority Data

Jul. 19, 1983 [JP] Japan ................................. 58-130319

[51] Int. Cl.$^4$ ............................................. G01D 5/30
[52] U.S. Cl. ................................................. 250/231 SE
[58] Field of Search .................... 250/231 SE, 237 G; 340/347 P; 324/175; 156/659.1; 430/323, 324

[56] References Cited

U.S. PATENT DOCUMENTS

| 3,905,817 | 9/1975 | Bakewell | 156/659.1 |
| 4,162,399 | 7/1979 | Hudson | 324/175 |
| 4,233,592 | 11/1980 | Leichle | 340/347 P |
| 4,506,339 | 3/1985 | Kühnlein | 324/175 |

FOREIGN PATENT DOCUMENTS 54708  4/1983  Japan .

Primary Examiner—Edward P. Westin
Attorney, Agent, or Firm—Guy W. Shoup

[57] ABSTRACT

A rotary encoder has a rotor with reflector sections applied to its peripheral edge. The reflector sections are formed on a belt as a laminate of a lacquer layer, a metal foil layer, and an adhesive layer and are transferred to the edge of the rotor at selected intervals.

3 Claims, 3 Drawing Figures

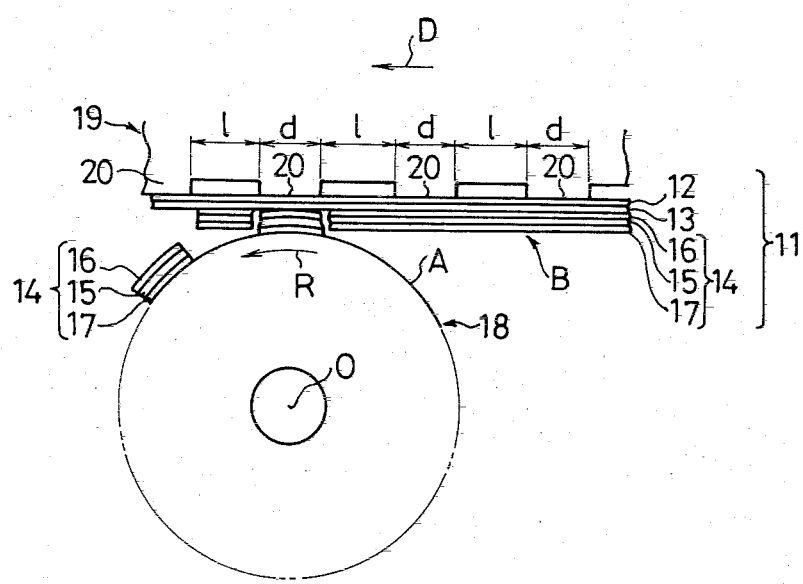

METHOD OF FABRICATING ROTOR OF OPTICAL ROTARY ENCODER

FIELD OF THE INVENTION

The present invention relates to an optical rotary encoder which rotates together with the shaft of a rotary driving device to intermittently reflect the light falling on the reflectors mounted on its outer periphery for encoding the light and, more particularly, to the rotor of the encoder. The invention also relates to a method of fabricating the rotor.

BACKGROUND OF THE INVENTION

Of the rotary encoders used to control industrial equipments such as numerically controlled machine tools and machine tool robots, optical encoders which are susceptible to electrical noise have gained wide acceptance.

The structure of such an optical rotary encoder is shown in FIGS. 1 and 2, where the rotor 1 of the encoder is connected to the shaft of a rotary driving device (not shown). The rotor 1 has a plurality of circumferentially spaced reflectors 3 on the outer periphery of the body 2 of the rotor 1. Usually, the reflectors 3 are equally spaced apart from one another. A sensor head 4 has a light projector 5 and a light receiver 6 both of which are disposed opposite to the reflectors 3 of the rotor 1. An optical-fiber cable 7 for transmitting light terminates in the light projector 5. Another optical fiber cable 8 for receiving light terminates in the light receiver 6.

In the operation of the conventional optical rotary encoder constructed as described above, when the rotary driving device is set in motion, the rotor 1 is rotated by the shaft of the driving device. Then, the light which is projected from the light projector 5 through the fiber 7 on the area across which the reflectors 3 pass is intermittently reflected by the reflectors 3 and encoded. The encoded signal is received by the light receiver 6 and guided to the fiber cable 8. Then, it is taken from the cable as a control signal.

The performance of this conventional encoder depends strongly on the state of the reflectors 3, and therefore it is necessary to prevent corrosion of the reflectors 3 during longtime use for avoiding decrease in the reflectivity. The performance of the encoder also depends on the accuracy of intervals at which the reflectors 3 are disposed. Hence, it is also necessary to enhance this accuracy.

SUMMARY OF THE INVENTION

Accordingly, it is an object of the present invention to provide an optical rotary encoder having reflectors which do not corrode and hence their reflectivity does not deteriorate even if it is used for a long term.

This object is achieved by an optical rotary encoder having reflectors which are composed of metal foils coated with lacquer.

It is another object of the invention to provide a method of fabricating the rotor of an optical rotary encoder in such a way that the accuracy of intervals at which the reflectors are disposed is better than conventional, the method being suited for mass production of such rotors.

This object is achieved by providing a method comprising the steps of: preparing a belt which consists of a carrying sheet, a layer of release agent, a reflector, and a layer of adhesive stacked in this order, the reflector being a metal foil coated with lacquer; disposing the body of the rotor that is rotatably held and a die which can move along the rotating surface of the body in a given direction in such a way that the outer periphery of the body is close and opposed to convex pressing portions formed in a row on the die in the given direction at suitable intervals; inserting the belt between the body of the rotor and the opposite die in such a way that the surface on which the adhesive is applied is opposed to the body of the rotor; rotating the body of the rotor and, at the same time, pressing the die on the body of the rotor; moving the die in the given direction at a velocity equal to the peripheral velocity of the outer periphery of the body while heating the die; and pressing the reflector of the belt on the outer periphery of the body with the convex pressing portions while carrying the reflector with the body of the rotor and the die to transfer pieces of the reflector onto the outer periphery.

Further objects, features, and advantages of the invention will become apparent from a consideration of the following description, the appended claims, and the accompanying drawings.

BRIEF DESCRIPTION OF THE DRAWINGS

FIG. 3 is a view for illustrating the steps of fabricating the rotor of an optical rotary encoder in accordance with the present invention.

DETAILED DESCRIPTION OF THE INVENTION

Figure 1:
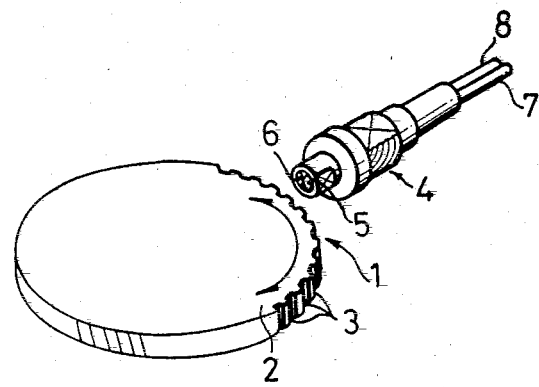
FIG. 1 is a schematic perspective view of a conventional optical rotary encoder for showing the general structure.
Figure 2:
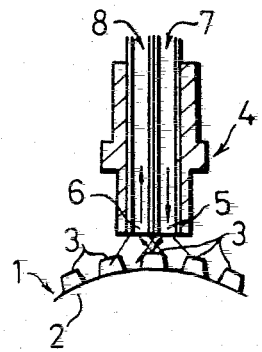
FIG. 2 is an enlarged view partially in section of the main portions of FIG. 1.

Referring to FIG. 3, there is shown an optical rotary encoder embodying the concept of the present invention. The encoder has a belt 11 on which a reflector 14 is stuck. The belt 11 includes a carrying sheet 12 which is made from polyester in this specific example. One side of the sheet 12 is coated with release agent 13, or mold release. The belt 11 further includes the reflector 14 that is a lamination composed of a metal foil 15 and a layer of lacquer 16. The foil 15 is made of aluminum, chromium, or other material. The reflector 14 is stuck to the carrying sheet 12 in such a way that the layer of lacquer 16 is in contact with the coating of the release agent on the carrying sheet 12. Adhesive 17 is applied to the opposite surface of the metal foil 15 of the reflector 14.

The body 18 of the rotor takes the form of a disk and is made from a black plastic such as ABS resin or POM. The body 18 is rotatably supported at its center O.

A die 19 can move in a given direction indicated by the arrow D along the rotating surface of the body 18 of the rotor. The die is provided with an array of convex pressing portions 20 which are arranged in the direction of the arrow D at regular intervals of l. The width d of the pressing portions 20 is set equal to the interval l. The body 18 of the rotor and the die 19 are so disposed that the outer periphery A of the body 18 is close and opposed to the pressing portions 20 of the die 19. One example of dimensions practically used is given below.

length of outer periphery of rotor body 18=60.0 mm
thickness of outer periphery of rotor body 18=2.8 mm
interval l between successive pressing portion 20=0.15 mm width d of pressing portions 20=0.15 mm Under these conditions, the belt 11 on which the reflector is stuck is inserted between the rotor body 18 and the opposite die 19 such that the surface B to which the adhesive is applied is opposed to the body 18. Then, the body 18 is rotated in a direction indicated by the arrow R. At the same time, the die 19 is moved at a velocity equal to the peripheral velocity of the outer periphery A of the rotor body 18 in a given direction indicated by the arrow D while the die 19 is pressed on the body 18. At this time, the die 19 is heated to a temperature of the order of 170° to 200° C.

By the operation effected in this way, the belt 11 to which the reflector is stuck is carried in the direction of the arrow D by the body 18 and the die 19. Then, the reflector 14 of the belt 11 is cut into pieces of width d under the pressure of the convex pressing portions 20. The pieces are stuck to the outer periphery A of the rotor body 18 at regular intervals and are transferred onto it, thus completing the rotor of the optical rotary encoder having the reflectors where the metal foils are coated with lacquer.

After completing the sequence of operations for one rotor body 18, the body 18 is replaced by another. Then, the die 19 is returned to its initial position, and a new belt 11 is supplied. Subsequently, the same sequence of operations is repeated. In this way, rotors of rotary encoders can be mass-produced.

According to the manufacturing method as described above, the cut pieces of the reflector 14 of the belt 11 is transferred onto the outer periphery A of the rotor body 18 at intervals equal to the intervals at which the convex pressing portions 20 are formed on the die 19. Therefore, the reflectors on the fabricated optical rotary encoder are almost equally spaced apart from one another.

Since the pieces of the reflector 14 are subjected to a given pressure when they are transferred onto the outer periphery A of the body 18, the metal foils 15 are made uniform. Hence, when the rotor of the encoder is used, it will not diffusely reflect the light falling on the rotor.

In the optical rotary encoder where the reflectors consist of the metal foils coated with lacquer, the lacquer protects the surface of each foil against corrosion and, accordingly, the rotor can be suitably used for a long term. Obviously, the manufacturing method of the rotor enjoying these advantages is not to be limited to the aforementioned example.

For example, the convex pressing portions 20 are formed on the die 19 at regular intervals to transfer the pieces of the reflector 14 onto the outer periphery A of the body 18 at regular intervals. It is also possible to transfer the pieces of the reflector 14 onto the outer periphery A at irregular intervals by forming the pressing portions 20 on the die 19 at irregular intervals.

Further, in the above embodiment, the reflector 14 of the belt 11 is cut into pieces of width d by being subjected to the pressure from the pressing portions 20. It is also possible to cut the reflector 14 of the belt 11 into pieces beforehand. In this alternative case, the belt 11 is required to be aligned with the die 19, but it offers the advantage that the fringe of the pieces of the reflector 14 transferred onto the outer periphery A of the body 18 appears as a straight line with certainty.

As thus far described, in the novel rotor of the optical rotary encoder, the reflectors have the metal foils coated with lacquer. Therefore, the rotor does not readily corrode, and the reflectivity will hardly deteriorate with passage of time. Consequently, it can be employed for a long period.

According to the novel method of fabricating the rotor of an optical rotary encoder, the pieces of the reflector of the belt are transferred onto the outer periphery of the rotor body at intervals equal to the intervals at which the convex pressing portions are formed on the die. Therefore, the intervals between the successive pieces of reflector on the rotor of the manufactured optical rotary encoder are almost uniform, thereby enhancing the accuracy. In addition, the method is well suited to mass-production of such rotors.

What is claimed is:

1. A method of fabricating the rotor of an optical rotary encoder using a belt to which a reflector is stuck, the reflector consisting of a metal foil whose one surface is coated with a lacquer, the reflector being stuck to the surface of a carrying sheet on which a release agent is coated such that the layer of the lacquer is in contact with the coating of the release agent, the other surface of the foil being coated with an adhesive, said method comprising the steps of:

disposing the body of the rotor that is rotatably held and a die which can move along the rotating surface of the body of the rotor in a given direction in such a way that the outer periphery of the body of the rotor is close and opposed to convex pressing portions formed in a row on the die in the given direction at suitable intervals;

inserting the belt between the body of the rotor and the opposite die in such a way that the surface on which the adhesive is applied is opposed to the body of the rotor;

rotating the body of the rotor and, at the same time, pressing the die on the body of the rotor;

moving the die in the given direction at a velocity equal to the peripheral velocity of the outer periphery of the body while heating the die; and pressing the reflector of the belt on the outer periphery of the body with the convex pressing portions while carrying the reflector with the body of the rotor and the die to transfer pieces of the reflector onto the outer periphery.

2. A method of fabricating the rotor of an optical rotary encoder as set forth in claim 1, wherein the reflector is cut into the pieces under the pressure of the convex pressing portions.

3. A method of fabricating the rotor of an optical rotary encoder as set forth in claim 1, wherein the reflector has been previously cut into the pieces.

* * * * *